United States Patent

Poggenburg et al.

[11] Patent Number: 5,415,469
[45] Date of Patent: May 16, 1995

[54] BRAKE SYSTEM

[75] Inventors: Rüdiger Poggenburg, Vaihingen; Eberhard Sonntag, Gerlingen; Thomas Meier, Freiberg; Alfred Strehle, Fellbach, all of Germany

[73] Assignee: Robert Bosch GmbH, Stuttgart, Germany

[21] Appl. No.: 256,561

[22] PCT Filed: Nov. 27, 1993

[86] PCT No.: PCT/DE93/01130

§ 371 Date: Jul. 14, 1994

§ 102(e) Date: Jul. 14, 1994

[87] PCT Pub. No.: WO94/13517

PCT Pub. Date: Jun. 23, 1994

[30] Foreign Application Priority Data

Dec. 11, 1992 [DE] Germany ............ 42 41 844.5

[51] Int. Cl.$^6$ .................. B60T 8/66; B60T 8/26; B60T 8.32
[52] U.S. Cl. .......................... 303/106; 188/181 C; 303/103; 303/113.5; 364/426.01
[58] Field of Search ........... 303/106, 103, 102, 111, 303/96, 97, 98, 100, 105, 108, 109, 110, 113.5, 9.62, 9.75, 9.71; 180/197; 364/426.01, 426.02, 426.03; 188/349, 181 C, 181 A

[56] References Cited

U.S. PATENT DOCUMENTS

| 4,828,334 | 5/1989 | Salman | 303/100 |
| 5,124,921 | 6/1992 | Jonner et al. | 364/426.01 |
| 5,246,276 | 9/1993 | Pajonk et al. | 303/113.5 X |
| 5,284,385 | 2/1994 | Müller et al. | 303/113.5 |

FOREIGN PATENT DOCUMENTS

| 0509237 | 10/1992 | European Pat. Off. |
| 2143293 | 2/1973 | France |
| 3903833 | 8/1989 | Germany |
| 2157381 | 10/1985 | United Kingdom |
| 8904782 | 6/1989 | WIPO |

Primary Examiner—Douglas C. Butler
Attorney, Agent, or Firm—Felfe & Lynch

[57] ABSTRACT

A vehicle brake system is described in which a lower brake pressure is fed in at the rear axle compared with the brake pressure of the front wheels. For the purpose of feeding in this brake pressure, the difference VD between the fastest front wheel speed and the slowest rear wheel speed is formed and compared with a threshold value which depends on the vehicle deceleration. An increase in pressure is undertaken until the threshold value is reached. The threshold value is, furthermore, larger in the case of travel in a straight line than it is in the case of travel in a curve.

4 Claims, 1 Drawing Sheet

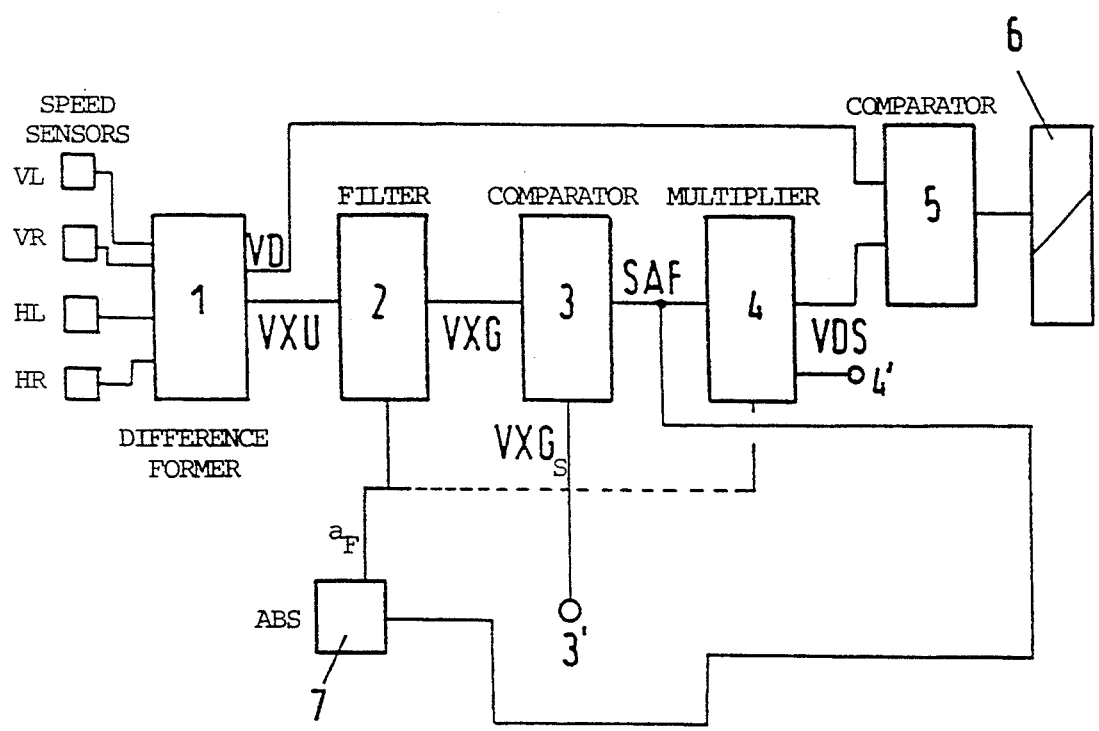

BRAKE SYSTEM

PRIOR ART

Brake systems are known in which, by means of pulsed valves, a brake pressure is fed in at the rear wheels of a vehicle which, when compared with the front axle brake pressure, corresponds to that of the known ideal brake pressure distribution (DE 39 01 923).

SUMMARY OF THE INVENTION

In the invention, the rear axle brake pressure is fed in as a function of the motion behavior of the vehicle and independent of the installed braking force distribution. The system further distinguishes between braking in a curve and braking during travel in a straight line, and an increased slip, which effects stronger braking by the rear wheels, is permitted in the case of braking during travel in a straight line.

BRIEF DESCRIPTION OF THE DRAWING

The single FIGURE is a diagram of the system of the invention.

DETAILED DESCRIPTION OF THE PREFERRED EMBODIMENT

Four speed sensors on the wheels generate wheel speed signals which are supplied to a block 1 which, from the speed signals of the left-hand front wheel $V_{VL}$, of the right-hand front wheel $V_{VR}$, of the left-hand rear wheel $V_{HL}$ and of the right-hand rear wheel $V_{HR}$, generates signals $$VXU = (V_{VL} - V_{HR}) - (V_{VR} - V_{HL}) \text{ and}$$

$$V_D = V_{Vmax} - V_{Hmin}$$

where $V_{Vmax}$ is the signal of the fastest front wheel and $V_{Hmin}$ is the signal of the slowest rear wheel. The signal VXU is filtered in a filter 2, the time constant of the filter being controllable by means of the vehicle deceleration F and, specifically, in such a way that the time constant decreases when the vehicle deceleration increases. It is assumed here that the vehicle is equipped with an anti-lock brake system and that the vehicle deceleration is obtained in an anti-lock brake system, from the gradient of the reference speed for example. The filtered signal VXG is supplied to a comparator 3 which compares this signal with a threshold value $VXG_S$, which is specific to the vehicle, is supplied via a terminal 3' and is, for example, 2 km/h. The comparator 3 emits a signal SAF when this threshold value is not exceeded. The signal emitted indicates that travel in a straight line is present. The signal can also be supplied to the anti-lock brake system 7 so that it can be taken into account in the anti-lock brake system control algorithm.

The deceleration signal of the anti-lock brake system 7 is also supplied to a multiplier 4 which multiplies the deceleration signal once by a vehicle-specific value (input via terminal 4') and, furthermore, undertakes a weighting of the product as a function of whether the signal SAF for travel in a straight line is present (weighting $a_1$) or not (weighting $a_2$), the weighting factor $a_1$ being greater than $a_2$ (e.g. $a_1=2$ and $a_2=1$). The output signal of the multiplier 4 obtained in this way represents the comparison value $VD_S$ for the signal VD. If the signal VD exceeds the signal value $VD_S$, a comparator 5 generates a signal by means of which a valve 6 is activated which then permits no further increase in brake pressure at the rear axle. In the case of individual wheel control at the rear axle, the inlet valves of the two rear wheel brakes can replace the valve 6. In the case of travel in a straight line, the valve 6 (or the valves) are at first activated at a higher slip than in the case of travel in a curve.

We claim:

1. Method for controlling brake pressure in a motor vehicle having front wheels, rear wheels, and brakes at said wheels, said method comprising measuring the speeds and $V_{VL}$ and $V_{VR}$ of the front wheels, determining the fastest front wheel speed $V_{Vmax}$ from $V_{VL}$ and $V_{VR}$, measuring the speeds $V_{HL}$ and $V_{HR}$ of the rear wheels, determining the slowest rear wheel speed $V_{Hmin}$ from $V_{HL}$ and $V_{HR}$, determining a difference $V_D = V_{Vmax} - V_{Hmin}$, determining whether the vehicle is travelling in a straight line or in a curve, determining a vehicle deceleration, determining a comparison value $V_{DS}$ based on said vehicle deceleration and whether said vehicle is travelling in a straight line or a curve, said comparison value $V_{DS}$ being larger when said vehicle is travelling in a straight line than when said vehicle is travelling in a curve, comparing said difference $v_D$ to said comparison value $V_{DS}$, and preventing an increase in brake pressure at said rear wheels when $v_D$ exceeds $V_{DS}$.

2. Method as in claim 1 wherein travel in a straight line or a curve is determined by determining a wheel speed difference $VXU = (V_{VL} - V_{HR}) - (V_{VR} - V_{HL})$, comparing VXU to a threshold value, and generating a signal indicating travel in a straight line when VXU does not exceed the threshold value.

3. Method as in claim 2 wherein said comparison value is weighted by a first factor $a_1$ when said signal indicating travel in a straight line is generated and a second factor $a_2$ when said signal is not generated, where $a_1 > a_2$.

4. Method as in claim 1 wherein VXU is filtered using a time constant dependent on said vehicle deceleration.

* * * * *